Figure 2:
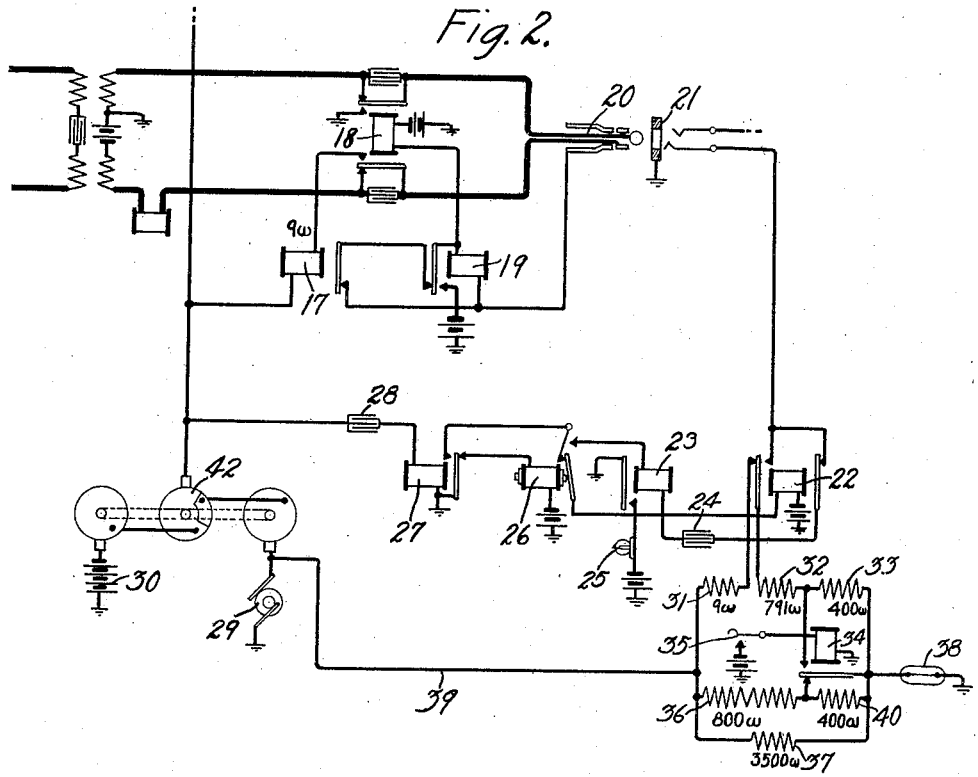

March 18, 1924.

J. B. RETALLACK

TESTING SYSTEM

Filed May 4, 1921

1,487,267

Inventor:
John B. Retallack.
by E. R. Nowlan Att'y.

Patented Mar. 18, 1924.

1,487,267

UNITED STATES PATENT OFFICE.

JOHN B. RETALLACK, OF EAST ORANGE, NEW JERSEY, ASSIGNOR TO WESTERN ELECTRIC COMPANY, INCORPORATED, OF NEW YORK, N. Y., A CORPORATION OF NEW YORK.

TESTING SYSTEM.

Application filed May 4, 1921. Serial No. 466,824.

*To all whom it may concern:*

Be it known that I, JOHN B. RETALLACK, a citizen of the United States of America, residing at East Orange, in the county of Essex, State of New Jersey, have invented certain new and useful Improvements in Testing Systems, of which the following is a full, clear, concise, and exact description.

This invention relates to a testing system, and more particularly to a system in which electrical apparatus is tested to determine its operation under various conditions as regards the amount of current supplied to it.

It is of course obvious that in testing different pieces of apparatus to ascertain the relative operating qualities of such apparatus, the current supplied to each piece of apparatus for each particular test must be the same. The use of the same resistance or resistances in the various testing circuits does not insure that the current flow will be the same, since the voltage of the source of current may vary.

For this reason it has been customary to employ a piece of apparatus known as a ballast lamp, which is a lamp provided with a filament of positive temperature coefficient. A variation of voltage would cause a variation in the current flow in the circuit, but the filament of a ballast lamp functions to vary the resistance in accordance with its increased or decreased temperature to maintain the current flow substantially the same, that is, for any change in impressed voltage there is a corresponding change in the resistance of the lamp filament which tends to maintain the current at a fixed value. This regulation can be maintained within extremely close limits if precision methods are used in the manufacture of the lamp. However, this results in a lamp of high cost. As a result the ballast lamps which are most commonly used allow a current flow variation of + or − .5% when subjected to sudden changes in effective voltage.

The chief characteristic of the ballast lamp as regards its resistance is that the resistance of the lamp is very low when cold. If the lamp is connected in a circuit containing a relay while its filament is cold, a high inrush of current results, which then falls off as the filament becomes heated. In order to test apparatus under varying current values it is necessary to have the temperature of the lamp raised to a point where it will be substantially constant during the period of the test except for those changes due to changes in the voltage of the current source.

It is the object of this invention to maintain a constant current flow in a testing circuit during variations in current flow through the device being tested.

A feature of the invention is the use of a number of parallel paths each including a resistance and means to connect the apparatus under test into one or the other of these paths whereby its operation under current of various values may be tested, while the resultant resistance of the network remains the same to allow a ballast lamp to operate at a uniform temperature, governed solely by variations in voltage.

An additional feature of the invention is the method of testing relays under the control of a ballast lamp and a balanced network of resistances.

A still further feature of the invention is an arrangement for testing a ringing relay in accordance with the principles above set forth, this relay being subject to the intermittent application of alternating current to its winding. In this case a ballast lamp is employed to maintain constant current flow in spite of the variations in potential at the source of alternating current.

It is thought that the invention will be best understood from the following detailed description, reference being had to the accompanying drawings.

Figure 1:
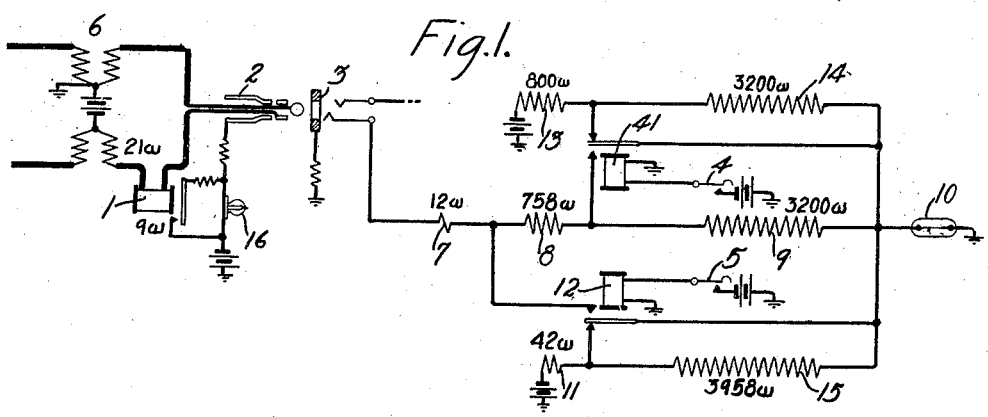

In the drawings, Fig. 1 shows an arrangement for testing a relay under three different conditions of current value, a ballast lamp being used to regulate the current flow. Fig. 2 shows an arrangement whereby a relay may be tested as to its operation under the influence of alternating current, regulated by a ballast lamp.

The operation of the arrangement shown in Fig. 1 is as follows; It is assumed that the relay under test is a supervisory relay indicated at 1 in this figure. The resistance of this relay has been assumed to be 9 ohms. It is of course to be understood that the resistance values which are assumed in the following description are merely arbitrary, and that any values can be assumed which will produce a proper state of balance.

To prepare for the test, plug 2 is inserted into jack 3. Assuming that keys 4 and 5 are in their normal positions, current will then flow from grounded battery, through the lower right-hand winding of repeating coil 6, which has been assumed to be of 21 ohms resistance, relay 1 and thence through the ring contacts of plug 2 and jack 3, a resistance 7, assumed to be of 12 ohms, a resistance 8, of an assumed value of 758 ohms, a resistance 9, of an assumed value of 3200 ohms, and thence through a ballast lamp 10 to ground. The total resistance of this circuit, as may readily be seen from an addition of the various resistances included therein, is 4000 ohms, exclusive of the resistance of the ballast lamp. This resistance value is assumed to be the resistance which will cause the release of the relay 1, provided it had been operated. It is to be observed that with keys 4 and 5 in their normal positions, two other parallel paths through ballast lamp 10 are in existence. One of these paths extends from grounded battery through a resistance 11 of 42 ohm value, the armature and back contact of relay 12, and thence through the ballast lamp to ground. The other parallel circuit extends from grounded battery, through a resistance 13 of 800 ohm value, and the armature and back contact of relay 41, and the ballast lamp to ground. Therefore, at this time, current is supplied to ballast lamp 10, through three parallel paths, one of 800 ohms, one of 4000 ohms, and one of 42 ohms resistance.

The attendant making the test next depresses key 4 to cause the energization of relay 41. The circuit of relay 1 now extends from grounded battery, the lower right-hand winding of repeating coil 6, the winding of relay 1, ring contacts of plug 2 and jack 3, resistance 7, resistance 8, the armature and front contact of relay 41, ballast lamp 10 to ground. The total resistance of this circuit exclusive of the ballast lamp is 800 ohms and sufficient current should flow to operate relay 1. The depression of key 4 therefor causes a test to be made as to whether the relay will energize properly.

As before ballast lamp 10 has current supplied to it through three parallel paths, the first as just above traced and including a resistance of 800 ohms; a second path extends from grounded battery, resistances 13 and 14 in series to the ballast lamp. The resistance of this path is 4000 ohms, the third path is the same as that previously described, and includes the 42 ohm resistance of resistance 11. It is therefore seen that with key 4 depressed, lamp 10 has current supplied to it through three parallel paths of values identical with those first described, which are 4000, 800, and 42 ohms, respectively, so that although a different amount of current is flowing through relay 1, the total resistance in the circuit of lamp 10 is the same.

If the operation of key 4 and the subsequent application of operating current to the winding of relay 1 cause it to operate successfully, key 4 is released and key 5 is depressed. The depression of key 5 causes the energization of relay 12 and applies "soaking" current to relay 1. This soaking current magnetically saturates relay 1, and a test is later made to see if it will properly release after saturation when the current through its winding is reduced to the release value.

As soon as relay 12 becomes energized, the circuit of relay 1 extends from grounded battery, lower right-hand winding of repeating coil 6, winding of relay 1, ring contacts of plug 2 and jack 3, resistance 7, armature and front contact of relay 12, ballast lamp 10 to ground. The resistance of this circuit exclusive of lamp 10, is 42 ohms. At the same time parallel paths are completed to maintain constant the current supplied to lamp 10. The first of these parallel paths extends from grounded battery, resistance 13, armature and back contact of relay 41, ballast lamp 10 to ground. The third circuit extends from grounded battery, through resistances 11 and 15 in series to ballast lamp 10. It may therefore, readily be seen that current is again supplied to lamp 10 through three parallel paths of the same value as first described, that is, one of 4000 ohms, one of 800 ohms, and one of 42 ohms.

After relay 1 has had an opportunity to become thoroughly saturated magnetically, key 5 is released, and a condition is again set up in which battery is supplied to the winding of relay 1 through a total resistance of 4000 ohms. The relay should release under the reduced current flow in this circuit.

If the relay has properly responded to the various tests, the plug 2 is withdrawn from the jack 3 and another plug may be inserted to test another relay.

The operation of relay 1 controls the lamp 16 in a well-known manner to indicate the energized or deenergized condition of this relay.

From the foregoing it may readily be seen that currents of various values may be supplied to relay 1 without causing any sudden change in the amount of current flowing through ballast lamp 10. Since the effective resistance of the circuits through which battery is supplied to this lamp is at all times the same, the current flow through lamp 10 is therefore, subject only to variations in voltage. The lamp automatically compensates for such variations within very close limits, and the test of relays under identical conditions of current value is assured.

The modified arrangement shown in Figure 2 will now be described.

In this case the relay to be tested is relay 130

17. This relay is a relay designed to respond to alternating current, and is assumed to be the relay used for tripping ringing current in a cord circuit of a well-known type. The circuit is arranged to test whether this relay will operate properly under the influence of alterating current and a ballast lamp is again used to maintain the current flow constant regardless of variations in the voltage of the source of alternating current.

When the plug 20 is inserted into jack 21, a circuit is completed from grounded battery, winding of relay 18, armature and back contact of relay 19, armature and back contact of relay 17, the sleeve contacts of plug 20 and jack 21, to ground. Relay 18 is energized in this circuit and its lower armature extends the circuit of the trip relay 17 to the testing device.

It will be noted that before the plug was inserted into the jack and with test key 35 in its normal position, a circuit is completed from ground through a source of alternating current 29, conductor 39, and thence by three parallel paths to ground through a ballast lamp 38. The first of these parallel paths extends from conductor 39 by way of a 9 ohm resistance 31, the armature and back contact of relay 22, a 791 ohm resistance 32 and a 400 ohm resistance 33 to the ballast lamp, the resistance of this branch being 1200 ohms; the second branch extends from conductor 39 through the 800 ohm resistance 36 to the ballast lamp, and the third branch extends from conductor 39 through the 3500 ohm resistance 37 to ballast lamp 38. Current flowing through the branch paths tends to bring the filament of the ballast lamp 38 to a temperature which will vary only in accordance with the voltage produced by the generator 29.

It is to be understood that, as before, the resistance values have been assumed merely for illustrative purposes, and that the invention is in no way to be limited by such assumption.

The condition set forth above exists after plug 20 is inserted into jack 21 during the period in which battery is being supplied to the distributor 42 from battery 30, since the direct current in this case cannot energize any of the relays of the system. The circuit extending from distributor 42 is branched, one path extending to relay 27 through a condenser 28, and the other branch extending through relay 17 and condenser 24 to relay 23. As stated, the flow of direct current cannot cause the energization of any of these relays.

When distributor 42, however, reaches a position in which it supplies alternating current to relay 17, relay 27 is energized. It should be noted that during the interval in which relay 27 is deenergized, a slow to release relay 26 is maintained in an energized condition by means of a circuit controlled at the armature and back contact of relay 27. Relay 26 being slow to release remains energized for a short interval after the energization of relay 27, whereupon a circuit is completed from grounded battery, winding of relay 22, armature and front contact of relay 26, armature and front contact of relay 27 to ground. Relay 22 is energized in this circuit and at its right hand armature opens the circuit through relay 23 to prevent the operation of such relay. At the same time, alternating current is supplied to the winding of relay 17, thence by way of the lower armature and front contact of relay 18, the ring contacts of plug 20 and jack 21, the left hand armature and front contact of relay 22 and resistance 32 and 33 to the ballast lamp 38 to ground. Current flowing in this circuit is not sufficient to allow the energization of relay 17.

It will be noted that the amount of current flowing through the ballast lamp 38 is the same as previously described since the two lower paths of the branch circuits extending from the source of potential to the ballast lamp remain unchanged, while in the upper path the 9 ohm resistance 31 has been replaced by the 9 ohm resistance of relay 17. The ballast lamp 38 is therefore operating under the same current conditions as before.

Current is supplied through relay 17 to the ballast lamp only during the interval in which slow to release relay 26 remains energized after the energization of relay 27. When relay 26 deenergizes the circuit of relay 22 is opened and this relay deenergizes. Relay 22 upon deenergization restores the circuit of the ballast lamp to the normal condition first described, by closing at its left hand armature the circuit through the upper branch resistance 31. At its right hand armature, relay 22 shifts the current flow to condenser 24, the winding of relay 23, the normal make before break contact of relay 26 and the armature and front contact of relay 27 to ground. Relay 23 operates and causes the lighting of lamp 25 to indicate that the distributor 42 is operating properly. As soon as the distributor 42 makes contact with the segment leading to the grounded battery relays 27 and 23 are deenergized. The deenergization of relay 27 allows relay 26 to be again energized.

The cycle of operations just described is repeated until key 35 is depressed to cause the energization of relay 34. With relay 34 energized and with battery being supplied to relay 17, relay 26 remains energized. The three parallel paths are now again closed to ballast lamp 38. The first branch extends from conductor 39 by way of resistance 31, the left hand armature and back contact of relay 22, resistance 32 and the armature and front contact of relay 34 to the ballast lamp. The resistance of this branch is 800 ohms. The second branch extends from conductor 39 through resistance 36 and a 400 ohm resistance 40 to the ballast lamp. The other branch through resistance 37 is the same as previously described. It will be seen that the ballast lamp now has current supplied to it through three parallel paths of the same effective resistance, as previously described, that is, three paths, one of 800 ohms, one of 1200 ohms and one of 3500 ohms. Before the first path was of 1200 ohms resistance, and the second of 800 ohms resistance. The effective resistance of the combined paths is of course the same in each case.

With relay 34 energized, a test is made to see whether relay 17 will be energized properly, as soon as distributor 42 applies alternating current to this relay. In this case relay 27 is again operated and relay 22 is operated during the interval before the release of relay 26. Alternating current now passes through the winding of relay 17, the lower armature and front contact of relay 18, ring contact of plug 20 and jack 21, the left hand armature and front contact of relay 22, resistance 32, the armature and front contact of relay 34 to the ballast lamp and ground. The resistance in this circuit exclusive of the ballast lamp is 800 ohms and relay 17 should energize. If relay 17 becomes energized, it will cause the energization of relay 19 which is normally shunted at the armature and back contact of relay 17. In the normal operation of the cord circuit, the energization of relay 19 brings about certain conditions to cause the release of relay 18, but since we are concerned only with the testing feature, these conditions will not be described.

It is to be observed that the effective resistance of the paths by which current is supplied to ballast lamp 38 is the same as described when key 35 was first depressed. In this case the resistance of relay 17 has been substituted for resistance 31 and we have again three parallel paths to ballast lamp 38, one of 800 ohms, one of 1200 ohms, and one of 3500 ohms.

When relay 26 deenergizes, relay 22 is deenergized and allows the energization of relay 23 to light lamp 25. At its left hand armature, relay 22 causes resistance 31 to replace the resistance of relay 17 and maintain the same effective resistance through which current is supplied to the ballast lamp. Although after relay 18 releases and before relay 22 releases, a temporary path is established including a battery associated with the repeating coil, a portion of the winding of such coil and the winding of the cord circuit supervisory relay, the testing operation has been completed at such time. Therefore, no change in the resistance of the network is introduced during the testing of the relay.

From the foregoing it may readily be seen that zero current, weak current and current of sufficient strength to energize relay 17 may be supplied to such relay without causing any variation in resistance of the circuit through which current is supplied to the ballast lamp. This of course allows the ballast lamp to operate at a uniform temperature varied only by the variation in voltage of the source 29 and brings about a condition such that the lamp may regulate the current within very close limits.

What is claimed is:

1. In a testing circuit, a resistance with a positive temperature co-efficient of resistance, a device to be tested, a resistance network composed of a plurality of multiple paths, means to supply current of various values to said device through said resistance, and interconnections between said multiple paths and said device to maintain the resistance of the total paths by which current is supplied to said resistance with a positive temperature co-efficient at a constant value.

2. In a testing circuit, the combination of a relay to be tested, a resistance network composed of a plurality of multiple paths said relay being normally connected in one of said paths, a resistance with a positive temperature co-efficient of resistance connected in circuit with said network to maintain a constant current therein, and means for making the resistance of the path in which the relay is normally connected equal successively to the normal resistance of each of the other paths and means for maintaining the resistance of the network at its normal value after each change in the resistance of the relay circuit.

3. In a testing circuit, the combination of a relay to be tested, of a network composed of a plurality of multiple paths, a resistance with a positive temperature co-efficient of resistance connected in circuit with said network to maintain a constant current therein, means for including said relay in one of the multiple paths, and means for automatically changing the impedance of the several multiple paths upon the testing of said relay so that the impedance of said network is substantially unchanged.

4. In a testing system, a source of current, a ballast lamp, a resistance network, a device to be tested, a circuit including said lamp, said network, and said device, and means to vary the amount of current flowing through said device and to maintain the current through said ballast lamp at a fixed value.

5. In a testing system, a source of current, a resistance with a positive temperature coefficient of resistance, an auxiliary resistance network, a device to be tested, a circuit including said resistance, said network and said device, and means to vary the amount of current flowing through said device, and to maintain the current through said resistance at a fixed value.

6. In a testing system, a device to be tested, a regulator in series therewith, and a compensating circuit associated therewith whereby when the current through said device is varied, the current through said regulator is maintained constant.

7. In a testing system, a device to be tested, a source of current, a resistance element connected thereto, a network having a plurality of parallel branches of different values connected to said element, and means for associating the device with any one of said branches, the current remaining constant in said resistance element.

8. In a testing system, a source of current, a network having a plurality of branches and connected to said source, a device to be tested included in one of said branches, and means for changing said device to another of said branches and to maintain constant the current flow from said source through said network.

9. The method of testing a device under various current values in a circuit including a network having a plurality of branches which comprises changing said device from one to another of said branches, subjecting said device to a different current value, and maintaining constant the current flow through the circuit.

10. The method wherein a voltage source is employed for supplying current to a device to be tested, said source having desired variations for testing purposes and undesired variations, and wherein a regulator is employed which comprises varying said current for testing purposes whereby said regulator tends to give a different regulating effect, and in compensating for the effect of said variations of testing current on said regulator.

In witness whereof, I hereunto subscribe my name this 2nd day of May A. D., 1921.

JOHN B. RETALLACK.